May 31, 1949.  H. A. FRY  2,471,613
CUTTER MOUNTING
Filed July 23, 1945  2 Sheets-Sheet 1
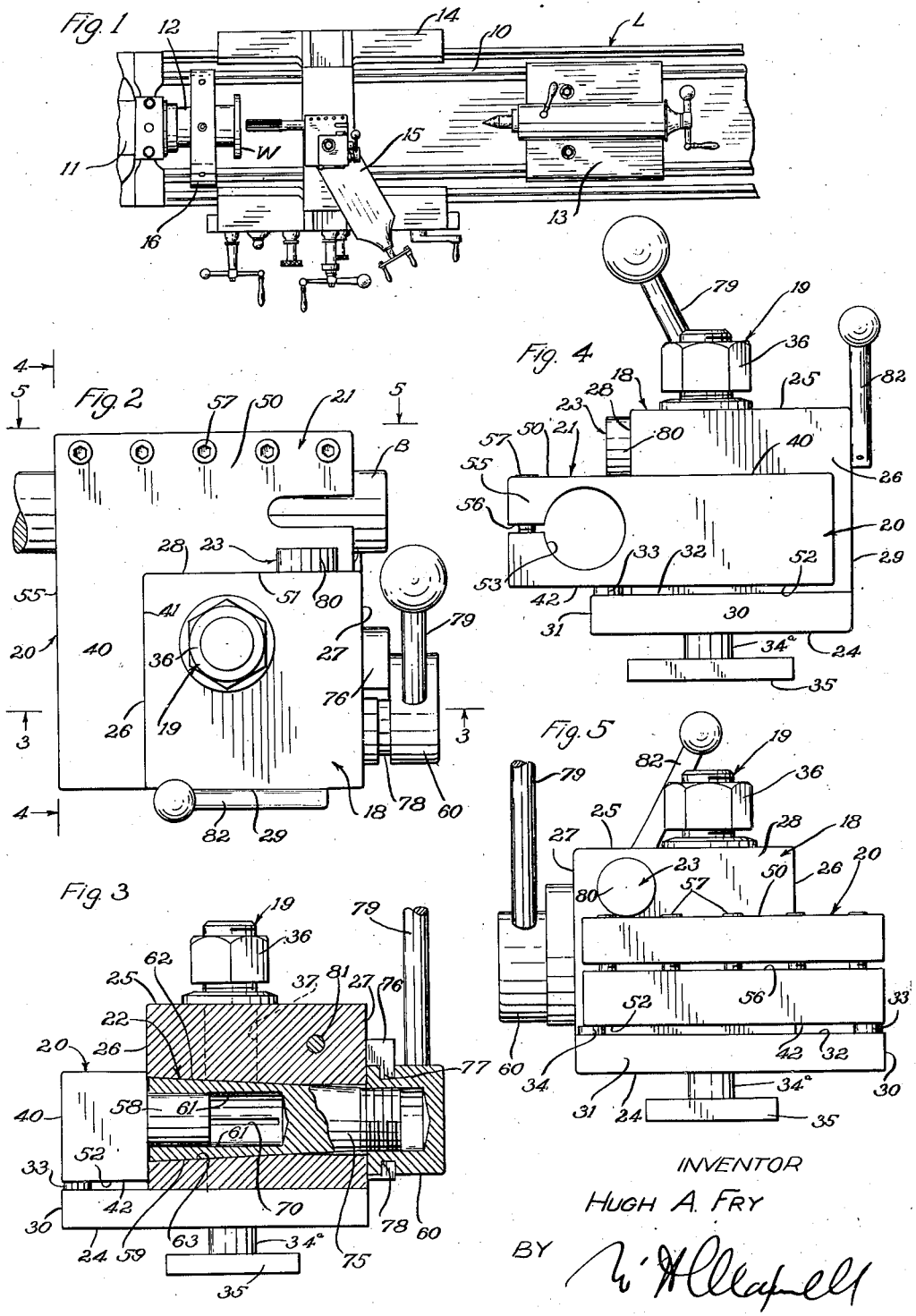
INVENTOR
HUGH A. FRY
BY
ATTORNEY

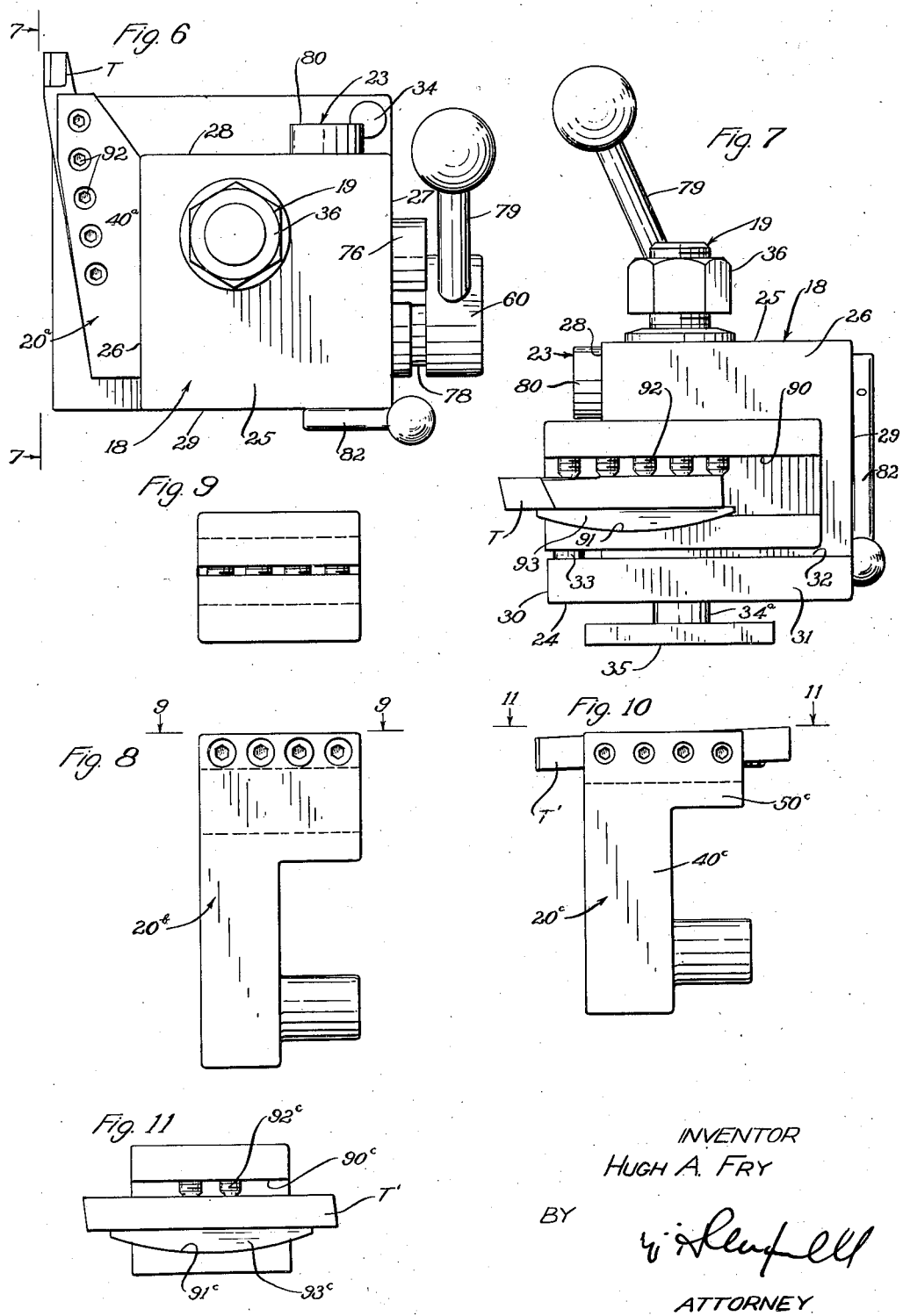

UNITED STATES PATENT OFFICE 2,471,613

CUTTER MOUNTING

Hugh A. Fry, Los Angeles, Calif.

Application July 23, 1945, Serial No. 606,545

3 Claims. (Cl. 82—36)

This invention relates to a cutter mounting and has particular reference to a device for use in machine tools for effectively carrying various cutters or cutting tools. It is a general object of the present invention to provide a cutter mounting of simplified, improved construction and which is inexpensive of manufacture and at the same time convenient and efficient in use.

Cutters of various kinds are employed in a wide variety of machine tools. For example, cutters such as turning tools, boring bars, facing tools, etc. are employed in various machines such as screw machines, planers, lathes, etc. For the purpose of the present disclosure I will refer to cutting tools such as tools for turning or facing work and to boring bars, but I do not wish it understood that my invention is in any way limited to any specific form or type of cutting tool. Further, I will make reference to the device that I have provided as being applied to a lathe but I do not thereby wish to limit the invention in that it will be obvious that it may be likewise applied to or used in connection with various types or forms of machine tools.

Cutters have been mounted in machine tools, for instance in lathes, by means of carriers which have been intended to serve various purposes. Carriers employed for supporting cutting tools are primarily intended to support the tools in an effective, secure, and accurate manner, and they are generally designed with a view of facilitating their application to or removal from the machine.

A common form of cutter carrier that has heretofore been employed in machine tools involves a block or shank to which the tool is applied, and a mounting stem projecting from the shank, and in the form of a turned spindle designed to be received in a straight bore provided in a head or turret which forms a fixed support. This general type of mounting possesses certain advantages, however, it is generally not too accurate due to the necessary clearance that must be provided between the mounting stem and the head in order to make the stem readily engageable into the bore of the head, and problems are presented in providing effective means for holding the carrier and head in the assembled position. In other cases tapered mounting stems have been provided to engage tapered bores in the mounting heads and screws have been provided in connection with the tapered stems operable to draw the stems tight into the bores. This general type of mounting is satisfactory in some respects, but it is not accurate in that it is practically impossible to draw a stem tight in a tapered bore and then remove it and later return it to exactly the same position, and it will be obvious that unless it can be returned easily and conveniently to exactly the same position the setting of the tool will vary. Further, it has been common in mountings of the general type referred to to provide for relative rotation between the mounting stems and the heads or supports to which they have been applied and adjusting screws have been provided to engage the tool carriers to effect adjustment designed to compensate for inaccuracies or variations that attend this type of construction. It will be apparent that when the stems are held so loose as to allow turning of the carrier they necessarily introduce play between the parts so that the assembly is not set up solid.

It is a general object of my present invention to provide a carrier and its mounting, that is, the combination of a tool carrier and a head or body for supporting it, in which the carrier and body when assembled for use are solid or set together tightly to be absolutely free of play or clearance, and in which there is a complete absence or elimination of adjusting screws, or the like. With the construction of the present invention the carrier and the mounting body or head are connected solidly so that these two parts are tight together and are held against movement in any manner or in any direction. With the construction that I have provided the carrier and body have a definite predetermined relative position to which they can be repeatedly returned and in which they are positively, rigidly held when set together.

It is a further object of this invention to provide a means connecting a tool carrier and a body so that the carrier is positively and firmly gripped to eliminate all play or clearance between the engaged parts and which operates so that the carrier is forcibly drawn into pressure engagement with the body as the connection is made tight or set. With the construction of the present invention I do not depend upon support of the carrier merely through a supporting stem and a set screw or adjustable stop, but rather I depend primarily upon a combination of the supporting stem, a fixed accurate supporting shoulder engagement between the carrier and body, and a clamping bearing engagement between an extensive face of the carrier and a corresponding part of the body. With the construction that I have provided I positively and definitely fix or stop the carrier in predetermined positions in two different directions.

Another object of my invention is to provide a carrier in which a cutting tool such as a turning tool is mounted in the carrier through a tilting block or supporting shoe of the type commonly used and universally understood by machinists, thereby eliminating entirely the need for adjusting screws or complicated adjustments with which ordinary machinists may not be familiar or which are inconvenient or undependable.

A general object of my present invention is to provide a combination involving, generally, a fixed head or a body, a carrier which supports a cutting tool of suitable form, and a mounting or means releasably connecting the carrier and body so that the carrier with a tool in fixed set position in it, can be rapidly applied to, removed from and reapplied to the body so that the tool is effectively supported relative to the body in exactly the same position each time the carrier is applied to the body.

The various objects and features of my invention will be fully understood from the following detailed description of typical preferred forms and applications of the invention, throughout which description reference is made to the accompanying drawings, in which:

Fig. 1 is a plan view of a typical machine tool or lathe showing the device of the present invention applied thereto;

Fig. 2 is an enlarged plan view of the tool mounting provided by the present invention showing it carrying a boring bar;

Fig. 3 is a detailed sectional view through the structure of the present invention, being a view taken as indicated by line 3—3 on Fig. 2;

Fig. 4 is a front elevation of the device shown in Figs. 2 and 3 being a view taken as indicated by line 4—4 on Fig. 2;

Fig. 5 is an inner side elevation of the device, being a view taken as indicated by line 5—5 on Fig. 2;

Fig. 6 is a plan view of the device of the present invention being a view similar to Fig. 2, showing a somewhat different form of tool carrier in place in combination with the body of the device;

Fig. 7 is a front elevation of the structure shown in Fig. 6, being a view taken as indicated by line 7—7 on Fig. 6;

Fig. 8 is a top plan view of another form of carrier that may be used in carrying out the invention;

Fig. 9 is a side view of the structure shown in Fig. 8, being a view taken as indicated by line 9—9 on Fig. 8;

Fig. 10 is a view similar to Fig. 8 showing another form of carrier, and Fig. 11 is a view similar to Fig. 9 of the structure shown in Fig. 10, being a view taken as indicated by line 11—11 on Fig. 10.

As above pointed out I have referred to the invention as applied to a lathe L as that is a typical and well known type of machine tool to which the invention can be applied advantageously. In the drawings I have shown the principal parts of a typical lathe, that is, I have illustrated the ways 10, the head 11 with a spindle 12, a tail stock 13, and a carriage 14 movable along the ways and carrying a tool supporting plate or slide 15. In the drawings a suitable work carrier 16 is applied to the spindle 12 carrying the unit of work W.

In the particular application of the invention shown it is applied to the slide 15 of the particular lathe illustrated, and for ordinary use of the device that I have provided the slide may be considered as a fixed support subject to its general movements effected by manipulation of the lathe carriage 14. If the structure is applied to a lathe of the type ordinarily known as a turret lathe, the unit may be mounted in place of the usual cross slide turret construction.

The structure of the present invention involves, generally, a body or fixed head 18, means 19 for mounting the body on a machine such as a lathe, or the like, a tool carrier 20, means on or forming a part of the means 21 for supporting a tool, means 22 releasably connecting the carrier and body and supplemental clamping means 23 which may or may not be employed in holding the carrier fixed relative to the body.

The body 18 of my construction may be termed a head or post to be set in a fixed position on or in a machine. In the simple form of the invention illustrated the body is a block-like structure or element having a flat bottom 24, a flat top 25, a flat front seat face 26, a rear face 27, a flat inner side 28, and an outer side 29. In addition to the parts named the body has one or more base flanges forming the vertical support for the cutter carrying portion of the carrier 20.

In the preferred form of the invention I provide the body with a front base flange 30 and a side base flange 31. The front base flange 30 projects horizontally forward from the lower end of the body to project forward from the bottom edge of the front face 26 of the body. Where a side base flange 31 is employed it may be continuous with or integrally joined to the flange 30 to project horizontally sideways from the bottom portion of the body to project from the bottom of the inner side 28 of the body.

In accordance with my invention the base flange or base flanges, if more than one is employed, serve to positively fix the vertical positioning of the cutter carrying portion of the carrier or, in other words, they form fixed vertical stops or supporting for the carrier. I may accomplish the desired supporting action through the base flanges of the body by merely accurately finishing the top surfaces 32 of the flanges. However, in practice it is advantageous to provide accurately finished rests on the base flanges to receive the carriers. In the case illustrated a finished rest 33, in the form of a solid fixed projection on the flange, is provided on the top 32 of the base flange 30 near what I will term its inner end and a similar or corresponding finished rest 34 is provided on the top of the base flange 31 at its rear end portion.

The means 19 provided for mounting the body on a machine preferably involves a simple tie bolt. In the drawings the bolt illustrated has a shank 34ᵃ with a head 35 on its lower end and a nut 36 threaded on its upper end. The head is to be anchored to the machine tool or lathe. The shank 34ᵃ slidably passes through a vertical opening 37 provided in the body 18. In accordance with my preferred construction I locate the vertical opening 37 in the body at or toward the corner of the block formed between the front 26 and inner side 28, with the result that the tying or clamping action gained by the tie bolt occurs at a point most advantageous relative to the point where the cutting tool is carried.

The tool carrier 20, in accordance with my invention, is adapted to be applied to the body 18 to be positively supported by the body in two directions, that is, in a vertical direction by the base flange of the body, and in a horizontal direction by one of the vertical walls of the body. In the form of the invention where the body has more than one base flange and more than one finished vertical wall, the carrier may be vertically supported at several points and may likewise bear on the body horizontally at several points.

The carrier employed in my device may vary widely depending upon the class of work to be done or the type of tool to be mounted, all of which will be apparent from a consideration of the several different forms of carriers that I have shown in the drawings. In general it may be said that the carrier that I have provided involves a shank or main portion 40 with a finished inner side or bearing face 41 and a finished bottom face 42. The shank, in practice, may be formed of a block or body of metal of sufficient size and so proportioned as to form a solid or rigid unit. The inner or rear finished face 41 of the shank is designed to seat or bear against the finished front face 26 of the body 18, as clearly shown in Fig. 2 of the drawings, while the finished bottom face 42 of the shank is designed to rest on the supporting base flange of the body. Where the body is provided with a rest such as the rest 33 shown in Fig. 4, the face 42 is finished and disposed to seat on the top of the rest.

The means 21, which is provided for supporting a tool, may be considered a part of the carrier 20 and will vary in different carriers, depending upon the particular tool to be supported. In the particular form of the invention illustrated in Figs. 1 to 5, inclusive, the carrier is intended to support a boring bar B and in this particular form of the invention the body 18 has a base flange at the inner side portion thereof. To provide an effective support for the boring bar the carrier has a lateral extension 50 extending rearwardly from its outer end portion to extend along the inner side of the body and this extension of the carrier has a finished inner face 51 to seat against the finished side 28 of the body, and has a finished bottom 52 to engage or seat upon the base flange 31 or upon a rest 32, if such is provided on the base flange. The means 21 in the case just described involves a socket or opening 53 formed through the carrier 20 to extend from the front 55 of the carrier through the inner end portion of the carrier proper and through the extension 50 thereof, as shown in the drawings. The portion of the carrier provided with the opening or bar socket 53 is provided with a cut or slit 56 and clamp screws 57 connect the split parts of the carrier so that that portion of the carrier can be tightened or drawn together to grip the bar B.

The means 22 that releasably connects the carrier and the body involves, generally, a mounting stem 58 projecting horizontally from the shank 20, a jaw member 59 carried by the body 18 to grip the stem 58 and draw it toward the body and an operating member 60 for the jaw member.

The mounting stem 58 is preferably formed integral with the shank 40 of the carrier 20 to project from the finished rear face 41 of the shank and it is located at a point near the end of the shank remote from where the tool is carried. In the preferred construction the stem 58 is a rather short stocky straight turned pin-like projection.

The jaw member 59 is a turned part with a straight central bore 61 proportioned to normally slidably receive the stem 58. The bore enters the forward end of the member 59 and extends a substantial distance into or through the member 59, as clearly shown in Fig. 3 of the drawings. The exterior 62 of the member 59 is turned with a slight taper, the taper being such that the member 59 is of greatest diameter at its forward end. The body 18 has a tapered bore 63 that receives the member 59, the taper of the bore 63 being the same as the exterior 62 of the member 59 and the parts are proportioned so that in a normal unactuated position the forward end of the member 59 is within the body and close to the front face 26 of the body.

The member 59 is provided with longitudinal bifurcations or cuts 70 extending longitudinally into it from its forward end so that the forward end portion of the member, or the bored portion of the member, is, in effect, split into a plurality of jaws. When the member 59 is in an unactuated position, but is located in the bore 63 of the body, the stem 58 of the carrier can be readily inserted in the bore 61 of the member 59.

It will be apparent that upon movement of the member 59 rearward in the bore 63 the taper between the member 59 and the bore of the body will cause the jaws of the member 59 to move in and grip the stem 58, and as the gripping engagement is increased by continued movement of the member 59 the stem 58, which is gripped, is drawn rearwardly causing the carrier 20 to be drawn toward the body 18 until it is stopped by the engagement of the rear face 41 of the carrier shank with the front face 26 of the body 18.

The member 59 has a projecting portion 75 at its rear end which projecting portion extends beyond the rear face 27 of the body 18 and is screw threaded. The operating member 60 for the jaw member 59 is in the form of a nut threaded onto the extension 75 of the jaw member. The operating nut 60 is arranged at the rear face 27 of the body to react or bear against the rear face of the body upon its being rotated in a direction to draw the jaw member 59 rearwardly in the tapered opening 63. In practice I prefer to hold the nut 60 in a fixed position at the rear of the body, leaving it free for rotation. For this purpose I secure a retainer 76 to the rear face 27 of the body 18 and provide the retainer with a lip 77 which slidably operates in a groove 78 provided in the nut. To facilitate convenient operation of the nut 60 I provide an operating lever 79 on the nut, as shown in the drawings.

The supplemental clamping means 23 which I may or may not employ, as circumstances require, involves a cam 80 arranged to engage or bear upon the carrier, a shaft 81 carrying and operating the cam and an operating lever 82 connected with the shaft so that it can be conveniently turned. In the form of the invention illustrated the cam 80 is arranged at the rear side 28 of the body 18 and is designed to be moved into pressure engagement with the top of the carrier extension 50. It is preferred to locate the cam 80 to be substantially opposite or above a rest on the body base flange. The shaft 81, which carries the cam 80, is rotatably carried in a transverse opening formed through the body. In the case illustrated where the cam 80 is at the side 28 of the body the shaft extends through the body to project from the side 29 of the body and the operating lever 82 for the shaft is fixed on the shaft at the side 29 of the body, as shown throughout the drawings.

In accordance with the preferred arrangement of parts the tapered bore 63, provided horizontally in the body to carry the jaw member 59 is located remote from the cutting tool carried by the carrier 20 or, in other words, the parts are arranged and related so that the opening 63 is as close as practical to the side 29 of the body, in which case the tie bolt or means 19 is located between the means 22 and the cutter or tool carried by the carrier 20.

In using the device that I have provided the body 18 is secured to a part such as the slide 15 of a lathe, and is made fast or is fixed as to position by the tie bolt or means 19. In practice the head 35 of the tie bolt is applied to the usual channel provided in the machine part and the nut 36 of the tie bolt is made tight so that the body 18 is solidly clamped in position and is, for all intents and purposes a fixed part.

To set the device ready for operation the desired tool, such as the desired boring bar with its cutter ready for use, is set in the carrier 20 in the desired position by tightening the screws 57. This is done when the carrier 20 is fixed to the body 18 by having tightened the nut 60 on the extension 75 of the jaw member 59. Under this condition the carrier is resting on one or more parts of the base flange or flanges of the body and is bearing in seating engagement with the front of the body. When the parts have thus been set as to position the nut 60 can be loosened on the extension 75 without being fully engaged therefrom allowing the stem 58 to be released so that the carrier can be readily removed from the body.

With the carrier removed other operations can be performed in the machine or other carrier with a different tool to be applied to the body, and employed as desired. Whenever it is desired to re-establish the first mentioned carrier relative to the body in exactly the same position that it was originally set, it is merely necessary to apply that carrier to the body so that it rests on the base flange or the rests thereof with its stem 58 extending into the jaw member 59, whereupon tightening of the nut member 60 on the extension 75 will cause the stem 58 to be positively gripped so that it is held against turning and so that it is drawn rearwardly causing the carrier to be seated against the front face of the body.

From the foregoing description it will be apparent that I have provided a construction which allows a carrier to be initially set with the tool in the desired position, and to be thereafter removed from and re-applied to the body as many times as desired without in any way disturbing the settings of the tool or, in other words, so that the tool is brought back to its original setting or position each time the carrier is applied to the body.

In Figs. 6 and 7 of the drawings I show a somewhat different form of carrier 20ª applied to the body 18. In this case the carrier is without an extension 50 and is intended to carry a typical, simple lathe cutting tool T rather than a boring bar, as above described. In the case of carrier 20ª a horizontal groove or channel 90 is formed in the front or forward face of the carrier shank 40ª to form the means for carrying the cutter, an arcuate seat 91 is formed in the bottom side of the channel and a plurality of clamp screws 92 are carried by the shank of the carrier to project downwardly from the upper side or wall of the channel opposite the arcuate seat 91.

A typical simple arcuate or curved tool supporting rest or shoe 93 is arranged in the seat 91 and the screws 92 are tightened against the tool T as it rests on the shoe 93. It will be readily understood how the screws 92 can be adjusted to position the tool T in any desired manner or at any suitable angle. The arcuate shoe in the curved seat 91 is free to rock or adjust itself to any desired angle. This type of tool supporting shoe and the setting or adjustment thereof is well understood and is familiar to any ordinary mechanic. In using the carrier 20ª the tool T is set at the desired angle or in the desired manner through the screws 92 and thereafter the carrier can be applied to the body 18 as many times as may be desired and in each instance it can be readily brought back to its exact original position through the means above described.

In Figs. 8 and 9 of the drawings I show a carrier 20ᵇ similar to the carrier 20 first described but proportioned somewhat differently, the carrier 20ᵇ being shown entirely separate and apart from the body.

In Figs. 10 and 11 I show a carrier 20ᶜ similar to the carrier first described in that the shank 40ᶜ has an extension 50ᶜ. However, this particular carrier is designed to carry a cutting tool T' and not a boring bar, and therefore it has a channel 90ᶜ in the side of the extension 50ᶜ and the tool T' is seated on an arcuate shoe 93ᶜ held on an arcuate seat 91ᶜ. Screws 92ᶜ are provided for securing the tool T' on the shoe.

The various carriers illustrated in Figs. 6 to 11, inclusive, are illustrated and described merely to make it clear that carriers of various sizes, shapes and designs to carry different tools can be readily employed in connection with a common body 18. With the construction provided by the present invention several different carriers or carriers with tools set to perform several different operations can be provided and an operator can successively apply different carriers to the body and carry out the desired operations with full assurance and confidence that the carriers will, in each case, be re-established in connection with the body in exactly the same position that they were originally set.

It is significant to note that through the construction that I have provided the carriers are re-established relative to the body not only in a vertical position, as by engagement with the base flange or flanges of the body, but also in a horizontal position by engagement with a vertical part of the body, either the front side 26 of the body or the inner side 28 of the body, or both. The engagement of the carriers with the front side of the body is positively assured when the means 22 is actuated to make the carrier tight in that the jaw member not only grips the stem of the carrier but also moves it rearwardly to bring the carrier into pressure engagement with the body. It is also highly significant that with my construction the stem is not only guided by the body but it is actually gripped so that there is a total elimination of working clearance such as ordinarily occurs in devices of this general character.

Having described only typical preferred forms and applications of my invention, I do not wish to be limited or restricted to the specific details herein set forth, but wish to reserve to myself any variations or modifications that may appear to those skilled in the art or fall within the scope of the following claims:

Having described my invention, I claim:

1. A cutter mounting for use in a machine tool including, a body having a finished face, a cutter carrier with cutter carrying means and having a finished face to cooperatively engage the face of the body and having a straight turned projection, and a single means gripping the carrier and holding it with its face in bearing engagement with the face of the body and including a jaw member carried in a tapered opening in the body and having a socket portion receiving the projection and contractible onto the projection when the member is moved lengthwise of the opening.

2. A cutter mounting for use in a machine tool including, a body having a finished front face, a cutter carrier with cutter carrying means and having a finished face to cooperatively engage the face of the body and having a straight turned projection, and a single means gripping the carrier and holding it with its face in bearing engagement with the face of the body and including a jaw member carried in a tapered opening in the body and having a socket portion at its forward end receiving the projection and contractible onto the projection when the member is moved lengthwise of the opening, the jaw member having a threaded portion projecting from the back of the body, and a nut threaded to said projecting portion of the jaw member for moving the jaw member lengthwise in the opening.

3. A cutter mounting for use in a machine tool including, a body having a finished face, a cutter carrier with cutter carrying means and having a finished face to cooperatively engage the face of the body, a single means gripping the carrier and holding it with its face in bearing engagement with the face of the body, means operable to locate the carrier in a predetermined position relative to the body in a direction angularly related to the direction in which the carrier bears on the body, and clamp means clamping the carrier in said predetermined position.

HUGH A. FRY.

REFERENCES CITED

The following references are of record in the file of this patent:

UNITED STATES PATENTS

| Number | Name | Date |
| --- | --- | --- |
| 60,163 | Faught | Dec. 4, 1866 |
| 1,013,129 | Clarke | Jan. 2, 1912 |
| 1,168,063 | Derbyshire | Jan. 11, 1916 |
| 2,371,377 | Braun | Mar. 13, 1945 |
| 2,389,858 | Kyle | Nov. 22, 1945 |